(12) United States Patent
Mehta et al.

(10) Patent No.: US 8,930,985 B2
(45) Date of Patent: Jan. 6, 2015

(54) TRIGGER-BASED TRANSACTIONAL ADVERTISING FOR TELEVISION

(75) Inventors: Japan A. Mehta, Coppell, TX (US); Armando P. Stettner, Westford Lane, MA (US); Shafiq Kassam, Lewisville, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 752 days.

(21) Appl. No.: 12/649,657

(22) Filed: Dec. 30, 2009

(65) Prior Publication Data

US 2011/0162001 A1    Jun. 30, 2011

(51) Int. Cl.
| | |
|---|---|
| *H04N 7/10* | (2006.01) |
| *H04N 7/025* | (2006.01) |
| *H04N 21/81* | (2011.01) |
| *G06Q 30/02* | (2012.01) |
| *H04N 21/466* | (2011.01) |

(52) U.S. Cl.
CPC ............ *H04N 21/812* (2013.01); *G06Q 30/02* (2013.01); *H04N 21/466* (2013.01); *H04N 21/818* (2013.01)
USPC .................... 725/32; 725/34; 725/40; 725/42

(58) Field of Classification Search
USPC ................................ 725/32, 40, 42
See application file for complete search history.

(56) References Cited

U.S. PATENT DOCUMENTS

| | | | | |
|---|---|---|---|---|
| 2001/0001160 | A1* | 5/2001 | Shoff et al. ................... | 725/51 |
| 2002/0087402 | A1* | 7/2002 | Zustak et al. .................. | 705/14 |
| 2003/0056219 | A1* | 3/2003 | Reichardt et al. .............. | 725/60 |
| 2006/0259924 | A1* | 11/2006 | Boortz ........................... | 725/32 |
| 2010/0095323 | A1* | 4/2010 | Williamson et al. ............ | 725/32 |
| 2011/0078723 | A1* | 3/2011 | Stettner et al. ................. | 725/32 |
| 2011/0078740 | A1* | 3/2011 | Bolyukh et al. ................ | 725/41 |

* cited by examiner

*Primary Examiner* — Pankaj Kumar
*Assistant Examiner* — Charles N Hicks (57) ABSTRACT

A method is performed by one or more devices within a closed distribution network to provide context-sensitive transactional advertisements. The method includes sending, to a video client, a trigger for initiating a context-specific transactional advertisement associated with a linear program segment and sending the linear program segment for presentation by the video client. The method also includes receiving, based on the trigger, a request from the video client for instructions for the context-specific transactional advertisement; determining, based on the request, contextual information for the linear program segment; and sending, to the video client and based on the contextual information, the instructions for the context-specific transactional advertisement.

19 Claims, 9 Drawing Sheets

TRIGGER-BASED TRANSACTIONAL ADVERTISING FOR TELEVISION

BACKGROUND INFORMATION

Transactional advertisements provide potential customers with the opportunity to initiate a transaction via the advertisement. Transactional advertisements are typically associated with computers using the Internet, such as when a Web page includes an advertising image with a link that can be selected by a user. Selecting the link may open a new web page that allows the potential customer to make a purchase directly.

Transactional advertising in a broadcast television environment has not been implemented in a cost-effective or practical manner. One significant challenge of transactional advertising in a television environment includes determining the context (or content) of linear programming to which a transactional advertisement should relate. While some of such interactions may be supported using, for example, Enhanced TV Binary Interchange Format (EBIF), EBIF typically requires significant investment (e.g., by a service or content provider) to supply EBIF-enabled content.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription multimedia service provider to provide triggers, associated with linear program segments, to launch context-sensitive transactional advertisements for television viewers in a closed distribution network. In some implementations, triggers may be provided to video clients (e.g., a set-top box or another in-home device) to identify where/how to check with a backend server to identify the context of a particular advertisement. In other implementations, triggers may be provided to video clients in-band or out-of-band to identify context of a particular advertisement.

The term "linear program segment," as used herein, may refer to a broadcast program, an advertisement, or portions thereof, included within a specific broadcast schedule. The term "transactional advertisement," as used herein, may refer to an advertisement that may be selected by a user to automatically initiate an interactive transaction process related to a linear program segment. For example, a transactional advertisement may include a hyperlink or icon that may be selected by a user to initiate a communication session with a remote server. In some implementations, transactional advertisements may launch an interactive television application may receive and respond to user input (e.g., via a remote control or control buttons on a video client device). In some cases, interactive television applications may also be referred to as "widgets."

Also, as used herein, the term "video client" may refer to any media processing device that may receive multimedia content over a network, and may provide such multimedia content to an attached display device (such as a television or computer monitor). A "subscription multimedia service," as used herein, may refer to television, telephone, networking and/or other multimedia services provided to customers over a closed distribution network. A closed distribution network may include, for example, cable, optical fiber, satellite, or virtual private networks that restrict unauthorized alteration of content delivered by a multimedia service provider. Also, as used herein, the terms "user," "viewer," "subscriber," and "customer" may refer interchangeably to a person who interacts with, orders, uploads, listens to, or plays multimedia content over a subscription multimedia service.

Figure 1:
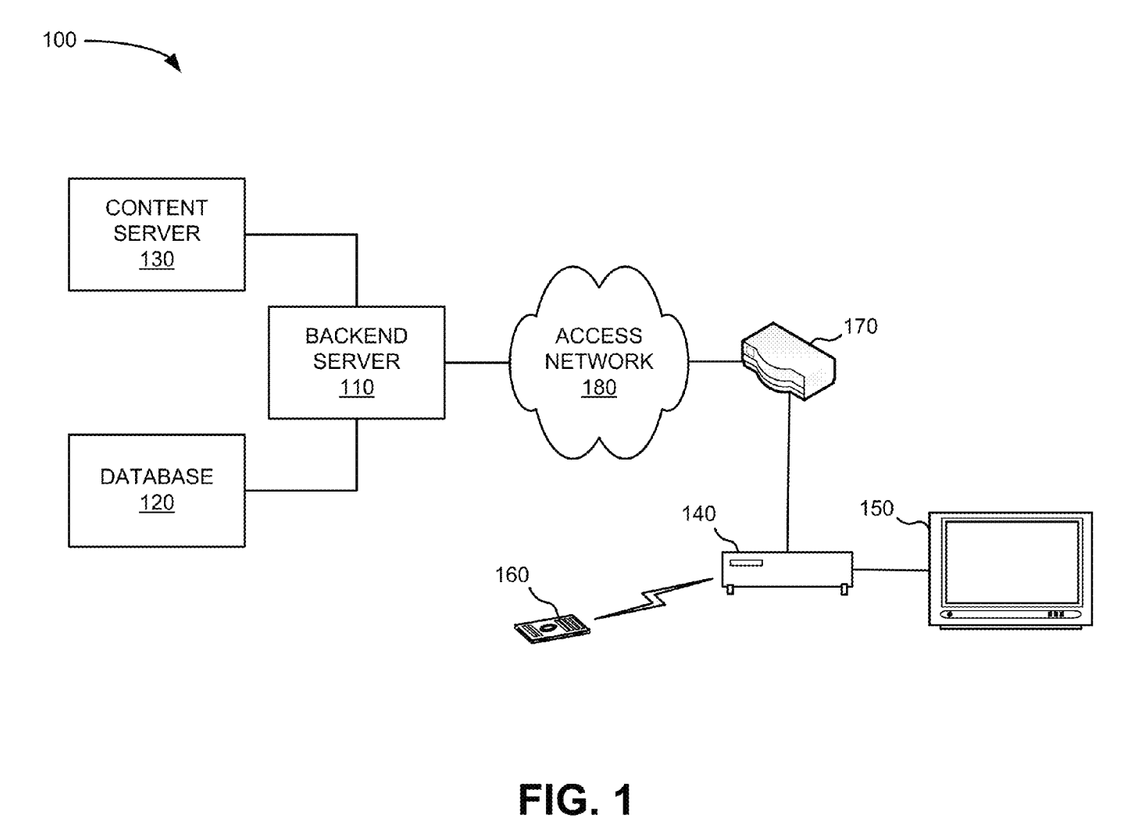
FIG. 1 depicts an exemplary network in which systems and/or methods described herein may be implemented.

FIG. 1 is a diagram of an exemplary network 100 in which systems and/or methods described herein may be implemented. As illustrated, network 100 may include a backend server 110, a database 120, a content server 130, a video client 140, a display device 150, a remote control 160, a local gateway 170, and an access network 180. Video clients 140, display devices 150, remote control 160, and gateway 170 may be located on a customer's premises and may be connected via access network 180 to backend server 110 at, for example, a subscription multimedia service provider's premises. Components of network 100 may interconnect via wired and/or wireless connections. For simplicity, a single backend server 110, database 120, content server 130, video client 140, display device 150, remote control 160, local gateway 170, and access network 180 have been illustrated in FIG. 1. In practice, there may be more networks, servers, databases, video clients, display devices, and/or local gateways. Also, in some instances, one or more of the components of network 100 may perform one or more functions described as being performed by another one or more of the components of network 100.

Backend server 110 may include one or more devices for providing content/information to video client 140 and/or display device 150 in accordance with commands that are issued from video client 140. Examples of backend server 110 may include a headend device that provides broadcast television programs and/or pay-per-view (PPV) events, a video-on-demand (VOD) device or another device that provides multimedia content upon request, an advertising server that provides advertising associated with multimedia content, and/or a program guide information server that provides information related to multimedia content available to video client 140. In general, backend server 110 may provide control over (e.g., via access network 180) television services for devices, such as video clients 140, display devices 150, and/or other network connectivity devices (e.g., telephones and personal computers, not shown) provided at the customer's premises. Backend server 110 may communicate with a variety of other components, such as databases, gateways, web servers, network switches or routers, television broadcast facilities, and other servers to facilitate television services to customers.

In implementations described herein, backend server 110 may provide, to video client 140, in-band or out-of-band triggers in linear programming streams that may be used to launch context-sensitive transactional advertisements. Backend server 110 may also receive requests from one or more video clients 140, such as requests for instructions regarding context-sensitive transactional advertisements and/or user selections of transactional advertisements. Backend server 110 may identify contextual information, such as a product disclosed within a particular linear program segment, a demographic profile for the linear program segment, a sponsor of the linear program segment, a product related to a product disclosed within the linear program segment (e.g., products from the same sponsor, co-branded products, accessories, and the like), etc. to identify a context-sensitive transactional advertisement and/or instructions for presenting the particular context-sensitive transactional advertisement.

Backend server 110 may also serve as a link between a video client 140 and a third-party server (not shown) to enable transactions between the third party server and video client 140. For example, backend server 110 may facilitate communications with video client 140 via access network 180 and communications with the third-party server via an external network (e.g., the Internet). While shown as a single server component in FIG. 1, in other implementations, backend server 110 may be distributed among multiple servers.

Database 120 may include one or more memory devices that maintain transaction histories (such as responses and/or purchases related to transactional advertisements) of video clients. In one implementation, database 120 may include exemplary fields, such as a user-identification field, a date field, a time field, a revenue field, an advertisement field, an interactive television application field, and/or a program content identification field. While only one database is shown in FIG. 1, database 120 may include multiple databases stored locally at backend server 110 and/or stored at one or more different and possibly remote locations. Database 120 may group customers' viewing histories by individual users, user groups, interactive television application type, and/or by program. Database 120 may also maintain additional or different information relating, for example, to interactive television applications used, types of advertisements, programs watched/recorded/ordered by viewers, etc. Information from database 120 may be retrieved by backend server 110 (or another server device), for example, to monitor advertising data, such as viewer response rates, revenue, etc.

Content server 130 may include one or more server entities, or other types of computation or communication devices, that gather, process, search, and/or provide information in a manner described herein. Content server 130 may provide content/information to backend server 110 in accordance with requests that are issued from video client 140. Examples of content from content server 130 may include linear advertising content, non-linear advertising content, linear program content, and interactive program content. In one implementation, content server 130 may retrieve advertising content that has been specifically requested by video client 140 based on triggers provided to video client 140. While shown as a single server device in FIG. 1, in other implementations, content server 130 may be distributed among multiple server devices.

Video client 140 may include any device capable of receiving, transmitting and/or processing information to and/or from access network 180. In one implementation, video client 140 may be a closed device (e.g., including a hardware/software configuration that is not accessible to the general public) that restricts unauthorized alteration of programming delivered over a closed distribution network. Video client 140 may provide video signals to display device 150. Examples of video client 140 may include a set-top box, a computer, a cable card, and a portable electronic device. Video client 140 may receive a television signal from gateway 170, may convert the signal to a form usable by display device 150, and may transmit the signal to display device 150 for display. Video client 140 may further allow a user to provide user input for interactive television applications (e.g., to navigate menu displays or select menu items) and to alter the programming provided to display device 150 based on a signal (e.g., a channel up or channel down signal) receive from, for example, remote control 160. Video client 140 may also be capable of sending data to backend server 110 via access network 180. In some implementations, video client 140 may be incorporated into display device 150, such as a television, a computer, or a portable electronic device.

In one implementation, video client 140 may display linear programming (e.g. a broadcast advertisement) that may receive user input to initiate a context-sensitive transactional advertisement. For example, video client 140 may receive an advertisement that may include a trigger to launch a particular transactional advertisement upon receipt of a launch signal from remote control 160. Video client 140 may transmit information about the user's selection to a server (e.g., backend server 110) to initiate a context-sensitive transactional advertisement.

Display device 150 may include a digital or analog display via which a user may view multimedia content (including, for example, conventional programming, interactive displays, and/or advertising). Display device 150 may refer to any device that can receive and display multimedia content delivered over access network 180 and/or through video client 140 for perception by users. Display device 150 may include technologies, such as cathode ray tube (CRT) displays, liquid crystal displays (LCDs), light-emitting diode (LED) displays, plasma displays, etc.

Remote control 160 may include a range of devices including function specific keys, number keys, and/or a full-text key pad. A user may interact with video client 140 using a keypad that is part of remote control 160, and signals representing key depressions may be transmitted to video client 140 via an infrared transmission or another type of transmission. Remote control 160 may allow a user to navigate a program guide, select channels or programs for viewing, adjust display characteristics, and/or perform other interactive functions related to viewing multimedia-type content provided over access network 180. In one implementation, video client 140 may allow a user to provide input to select a transactional advertisement via remote control 160.

Gateway 170 may include a network device that provides an interface from access network 180 to video clients 140 and/or other network connectivity devices (not shown). For example, when telecommunication services are provided to the customer's premises via an optical fiber, gateway 170 may include an optical network terminal (ONT) that connects to the optical fiber. The ONT may convert between signals appropriate for display device 150 and signals appropriate for transmission over optical fiber. For example, the ONT may include a coaxial cable connection that leads to video client 140 or display device 150. The ONT may also include an Ethernet output port that connects to a personal computer or a voice over Internet protocol (VoIP) telephone and/or a standard telephone port for connecting to a standard telephone.

Gateway 170 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Access network 180 may include a video signaling and distribution network and system that permit transfer of data between backend server 110 and video clients 140. Additionally, access network 180 may include, among other things, a firewall, a filtering mechanism, a proxy, and/or network address translation mechanisms. Access network 180 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 180 may provide customers, within a closed distribution network, with multimedia content provided, for example, by backend server 110 and/or content server 130. Access network 180 may also support communications between backend server 110 and video clients 140 using, for example, an Internet protocol (IP).

In implementations described herein, backend server 110 may provide linear programming (e.g., a television advertisement) along with a trigger to identify a transactional advertisement appropriate for the context/content of the linear programming. During the display of linear programming, a user may elect to launch a transactional advertisement for display on display device 150. The user may press an appropriate button on remote control 160 that sends a signal to video client 140. Based on the signal from remote control 160, video client 140 may identify the trigger associated with the current television advertisement. The trigger may, for example, direct video client 140 to request context information from backend server 110 or to launch a particular transactional advertisement relevant to the linear programming.

Figure 2:
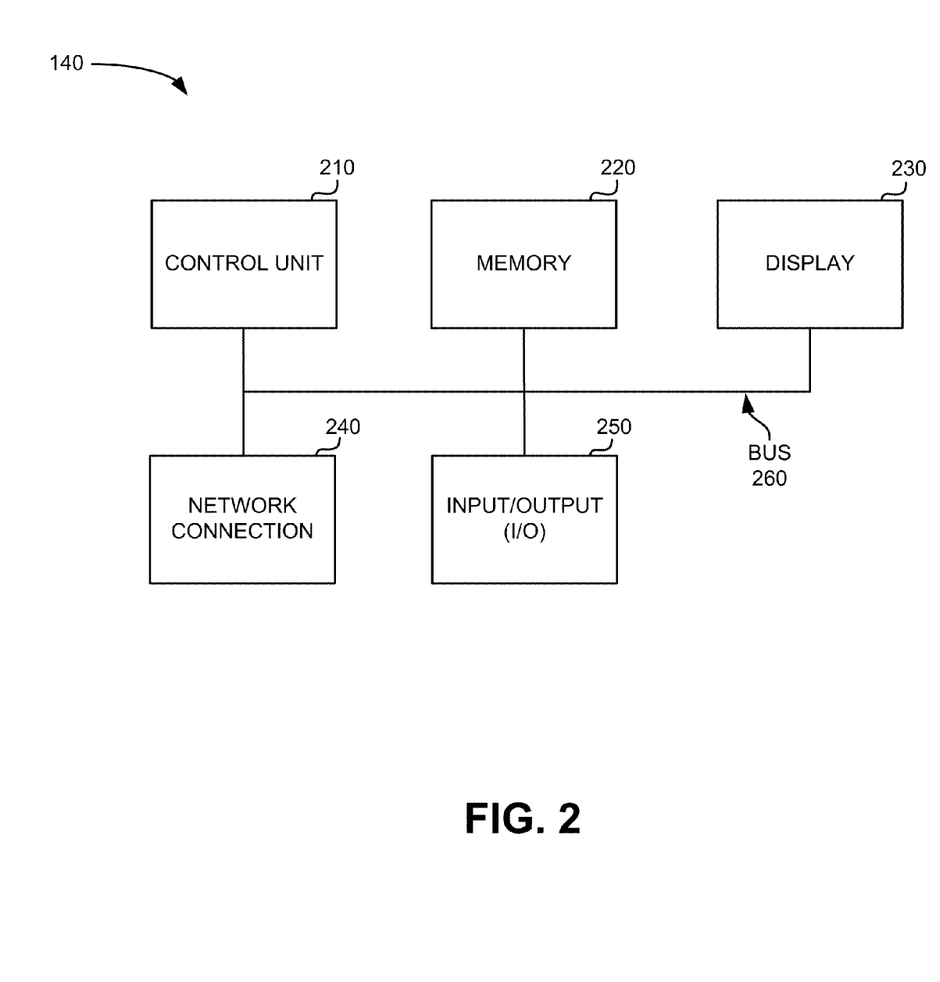
FIG. 2 is a block diagram of exemplary components of a video client that may be used in the network of FIG. 1.

FIG. 2 is diagram illustrating exemplary components of video client 140. As shown, video client 140 may include a control unit 210, a memory 220, a display 230, a network connection 240, an input/output (I/O) component 250, and a bus 260.

Control unit 210 may include one or more processors, microprocessors, or another type of processing device that interprets and executes instructions. Among other functions, control unit 210 may collect and store viewer activity associated with television programming. Control unit 210 may execute instructions to send viewing history information to another device, such as backend server 110. Control unit 210 may also receive information and/or instructions from other devices, such as backend server 110.

Memory 220 may include one or more dynamic or static storage devices that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store a viewer activity log to send at a later point in time, such as when requested by backend server 110.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables video client 140 to communicate with other devices and/or systems, such as backend server 110. For example, network connection 240 may include an Ethernet interface, an optical interface, a coaxial interface, a radio interface, or the like. Network connection 240 may allow for wired and/or wireless communication. Network connection 240 may be configured to connect video client 140 to a packet-based IP network.

Input/output devices 250 may generally include user input devices such as external buttons, and output devices, such as LED indicators. With input/output devices 250, a user may generally interact with video client 140. In some implementations, input/output devices 250 may be implemented via a remote control (e.g., remote control 160). Bus 260 may provide an interface through which components of video client 140 can communicate with one another.

As will be described in detail below, video client 140 may perform certain operations relating to displaying information and communicating viewer activities to a server, such as backend server 110. Video client 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices. The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of video client 140, in other implementations, video client 140 may include fewer, different, differently arranged, or additional components than those depicted in FIG. 2. In still other implementations, one or more components of video client 140 may perform one or more other tasks described as being performed by one or more other components of video client 140.

Figure 3:
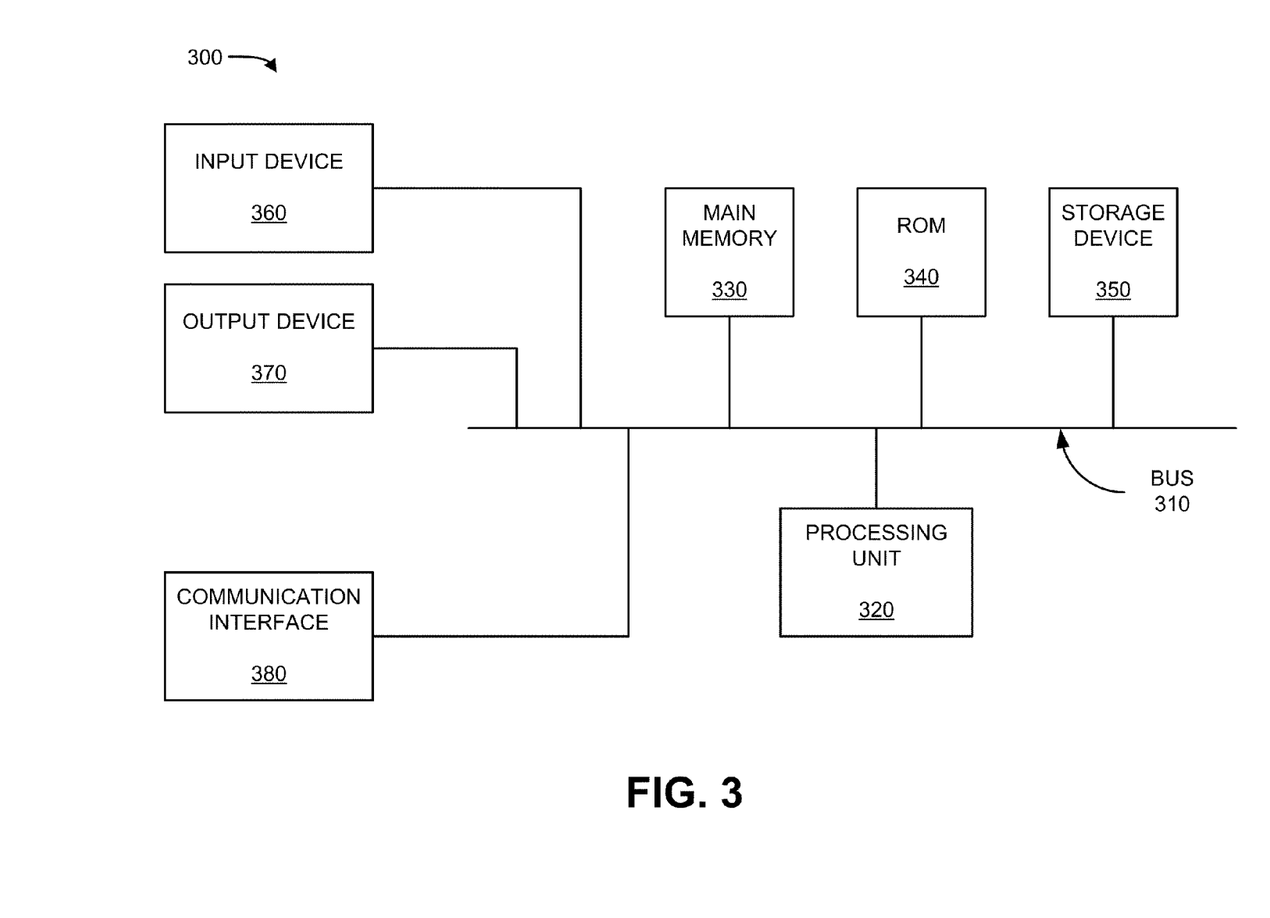
FIG. 3 is a block diagram of exemplary components of a device that may correspond to a backend server and/or a content server of FIG. 1.

FIG. 3 is a diagram of exemplary components of a device 300 that may correspond to backend server 110 and/or content server 130. As illustrated, device 300 may include a bus 310, a processing unit 320, a main memory 330, a read-only memory (ROM) 340, a storage device 350, an input device 360, an output device 370, and a communication interface 380.

Bus 310 may include a path that permits communication among the components of device 300. Processing unit 320 may include one or more processors, microprocessors, or other types of processing units, such as application-specific integrated circuits (ASICs), field-programmable gate arrays (FPGAs), etc., that may interpret and execute instructions.

Main memory 330 may include a RAM or another type of dynamic storage device that stores information and instructions for execution by processing unit 320. ROM 340 may include a ROM device or another type of static storage device that may store static information and instructions for use by processing unit 320. Storage device 350 may include a magnetic and/or optical recording medium and its corresponding drive. In one implementation, storage device may include database 120 or another database. Storage device 350 may store, for example, schedule and/or context information associated with advertising and programming for a subscription multimedia service provider.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as video client 140.

As will be described in detail below, device 300 may perform certain operations associated with providing transactional advertising for a subscription television service. Device 300 may perform these and other operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. In still other implementations, one or more components of device 300 may perform one or more other tasks described as being performed by one or more other components of device 300.

Figure 4:
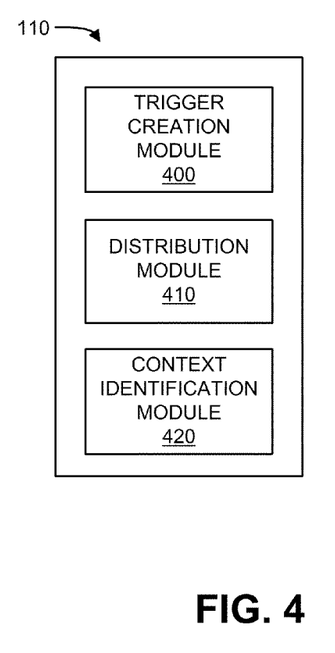
FIG. 4 depicts a diagram of exemplary functional components of the backend server illustrated in FIG. 1.

FIG. 4 is an exemplary diagram of functional components of backend server 110. The functional components of backend server 110 may be implemented by, for example, one or more of the components of device 300 (FIG. 3). As shown, backend server 110 may include a trigger creation module 400, a distribution module 410, and/or a context identification module 420.

Trigger creation module 400 may include hardware or a combination of hardware and software to generate triggers that may be used by video client 140 to initiate requests for transactional advertisements. Trigger creation module 400 may receive (e.g., based on a classification of a linear program segment by a network administrator) indications of what program segments are to be interactive program segments requiring transactional advertising. Trigger creation module 400 may insert triggers in-band (e.g., within a MPEG-2 transport stream) with particular program segments and/or generate messages/files with trigger information that may be sent out-of-band.

Triggers may include, for example, an indicator that video client needs to provide a context-specific transactional advertisement during a particular linear program segment (e.g., a particular time and particular channel). In one implementation, the trigger may not actually include context-sensitive information, buy may include information to cause video client 140 to request context sensitive information from backend server 110 (e.g., from context identification module 420 or from another server that may determine contextual advertisements based on notification from the video client). In one implementation, trigger information may include a uniform resource identifier (URI) or other address to which video client 140 may send a request for appropriate transactional advertising instructions. Triggers that may be generated by trigger creation module 400 may include, for example, an in-band data trigger, an IP multicast message, a file that includes a schedule of linear program segments over a particular time period that are to be associated with transactional advertisements, or a guide data trigger that is incorporated into program guide data for multiple linear program segments. Trigger formats are discussed further in connection with FIG. 5.

Distribution module 410 may include hardware or a combination of hardware and software to send program content (that may include in-band triggers) and out-of-band triggers to video client 140. Distribution module 410 may provide multimedia content such as video, audio, interactive applications, and/or images that may be requested by video client 140. Distribution module 410 may include, for example, broadcast television programs and associated advertising, PPV programming, games, interactive television applications, images, files, and/or other media that may be made available to customers of a subscription multimedia service provider.

Context identification module 420 may include hardware or a combination of hardware and software to identify contextual information to respond to trigger-initiated requests from video client 140. For example, transactional advertisements may be cross-referenced to particular sources, keywords, demographics, interests, time of day, and/or or other indicators associated with content from, for example, a linear advertisement or another linear program segment. Video client 140 may encounter a trigger and send a request for instructions to backend server 110 (e.g., context identification module 420). In one implementation, context identification module 420 may associate appropriate advertising with the user's currently selected content and direct transactional advertisement and/or context-specific instructions to video client 140.

Although FIG. 4 illustrates exemplary functional components of backend server 110, in other implementations, backend server 110 may include fewer, different, differently arranged, or additional functional components than those depicted in FIG. 4. In still other implementations, one or more functional components of backend server 110 may perform one or more other tasks described as being performed by one or more other functional components of backend server 110.

Figure 5:
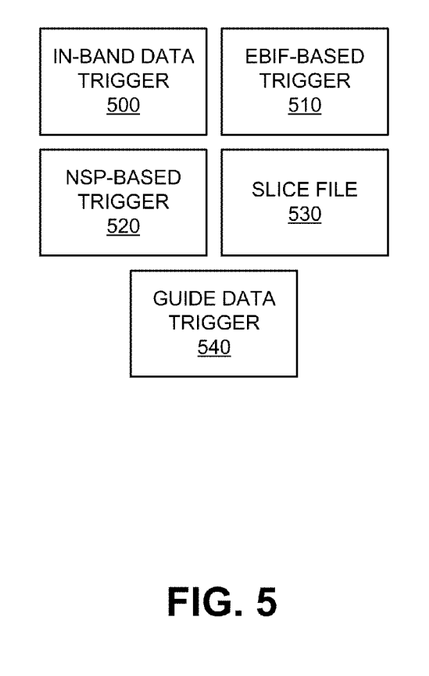
FIG. 5 illustrates a diagram of an exemplary formats for triggering a transactional advertisement according to an implementation described herein.

FIG. 5 illustrates a diagram of exemplary formats of triggers for a transactional advertisement that may be implemented by trigger creation module 400. As shown in FIG. 5, data trigger formats may include an in-band data trigger 500, an EBIF-based trigger 510, a NSP-based trigger 520, a slice file 530, and a guide data trigger 540.

In-band data trigger 500 may include a data unit, within a particular linear program segment, that causes a video client (e.g., video client 140) to request context information from a backend server (e.g., backend server 110). For example, in-band data trigger 500 may include an indication, to video client 140, that an interactive presentation is being provided to the viewer (e.g., on display 150) during the current linear program segment. In-band data trigger 500 may include instructions and/or information that causes video client 140 to request contextual information from backend server 110 so that video client 140 may provide context-specific materials in response to user interactions. In one implementation, in-band trigger 500 may include a URI or other address to which video client 140 may submit a request for context information. Thus, in-band trigger 500 may include the same information (e.g., the same URI) for multiple linear program segments. The request from video client 140 (and any response from backend server 110) may be submitted, for example, using an Internet protocol (IP) or another protocol. In-band data trigger 500 may be inserted, for example, by backend server 110 within metadata of a particular linear program segment (e.g., within a MPEG-2 transport stream).

EBIF-based trigger 510 may include an instruction in an EBIF format (e.g., a trigger recognizable by an EBIF user agent running on video client 140). Similar to in-band data trigger 500, EBIF-based trigger 510 may include a signal to the video client to pull a transactional advertisement. Thus, EBIF-based trigger 510 may not require detailed programming of a conventional EBIF resource file. Alternatively, the EBIF-based trigger 510 may include the context information of the associated linear program segment that enables video client 140 to launch the appropriate transactional advertisement without an additional query to backend server 110. EBIF-based trigger 510 may be inserted, for example, by backend server 110 within metadata of a particular linear program segment (e.g., within a MPEG-2 transport stream).

Network service provider (NSP)-based trigger 520 may include an out-of-band message that instructs a video client 140 to request contextual information from backend server 110 so that video client 140 may provide context-specific materials in response to user interactions. In one implementation, NSP-based trigger 520 may include a data file of multiple triggers for multiple linear program segments. In another implementation, NSP-based trigger 520 may include information for a single linear program segment and the relevancy of the NSP-based trigger may be determined by video client 140 (e.g., based on whether the video client is tuned to a particular channel at a particular time). For example, NSP-based trigger 520 may be provided to video client 140 as an IP multicast message (e.g., a user datagram protocol (UDP) message) or as another broadcast message.

Slice file 530 may include a schedule of linear program segments, such as advertisements, over an upcoming time period that will be associated with transactional advertisements. Backend server 110 may generate slice file 530 based on a knowledge of programming/advertising schedules which may be retrieved, for example, from database 120. In one implementation, slice file 530 may be provided to video client 140 and/or updated during an initialization sequence. Slice file 530 may provide trigger information for multiple program segments and channels over a particular time period (e.g., 2, 4, 12 hours, etc.) and may be refreshed at particular intervals. Video client 140 may monitor viewer selections and associate a particular program segment with trigger information from slice file 530.

Guide data trigger 540 may incorporate trigger information for particular linear program segments into guide data, such as interactive program guide (IPG) data that is provided from backend server 110 to video client 140. Guide data trigger 540 may provide an indication that an advertisement (or other linear program segment) scheduled at a particular timeslot and on a particular channel includes an interactive component. Thus, based on guide data trigger 540, video client 140 may request contextual information from backend server 110 so that video client 140 may provide context-specific materials in response to user interactions.

Figure 6:
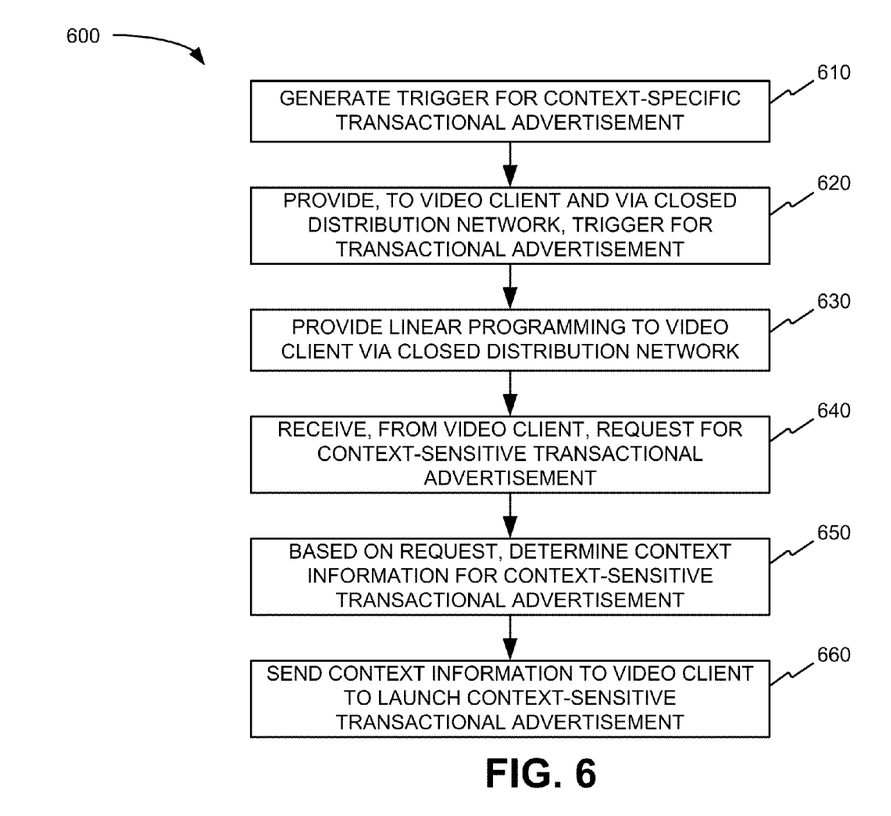
FIG. 6 is a flow chart illustrating an exemplary process for providing triggers for context-sensitive transactional advertising in a closed distribution network.

FIG. 6 provides a flow chart of an exemplary process 600 for providing triggers for context-sensitive transactional advertising in a closed distribution network. Some or all of process 600 may be performed by one or more servers associated with a subscription television service, such as backend server 110. In some implementations, some or all of process 600 may also be performed by one or more video clients 140 and/or content servers 130 in conjunction with backend server 110.

Process 600 may include generating a trigger for a context-specific transactional advertisement (block 610). For example, backend server 110 (e.g., trigger creation module 400) may generate a trigger for a transactional advertisement associated with a particular segment of linear programming, such as an advertising segment. The trigger may be generated in the format of one or more of in-band data trigger 500, EBIF-based trigger 510, NSP-based trigger 520, slice file 530, and guide data trigger 540 described above in connection with FIG. 5.

The trigger for a transactional advertisement may be provided to the video client and via a closed distribution network (block 620). For example, backend server 110 (e.g., distribution module 410) may send the previously-generated trigger (e.g., generated as described in process block 610) to video client 140 via access network 180. Depending on the type of trigger, backend server 110 may send the trigger in-band or out-of-band with other programming.

Linear programming may be provided to the video client via the closed distribution network (block 630). For example, backend server 110 (e.g., distribution module 410) may send multimedia content to video client 140 using access network 180. The multimedia content may include linear program segments, such as linear advertisements. In one implementation, the linear program segments may include the triggers for context-specific transactional advertisements. In other implementations, the linear program segments may be provided separately from any triggers.

A request for a context-sensitive transactional advertisement may be received from the video client (block 640). For example, backend server 110 may receive a signal from video client 140 indicating a user is viewing a linear program segment with a trigger for a transactional advertisement to be associated with the particular linear advertisement. The request may include, for example, an identification of the video client, an identification of the relevant trigger, a currently-tuned channel, listing of previously used transactional advertisements, and/or other information sufficient for backend server 110 to provide contextual information and/or a particular transactional advertisement for presentation by video client 140/display device 150.

Based on the request, context information for a context-sensitive transactional advertisement may be determined (block 650) and the context information may be sent to the video client to launch the context-sensitive transactional advertisement (block 660). For example, backend server 110 (context identification module 420) may use information from the notification sent by video client 140 to identify the contextual information and/or a particular transactional advertisement for presentation by video client 140/display device 150. In an exemplary implementation, backend server 110 may identify time and channel information from the video client to determine the linear advertisement being displayed to the user at the time the user initiated a request for a transactional advertisement. Backend server 110 may select a context-specific transactional advertisement based on the time and channel information. In another exemplary implementation, backend server 110 may receive, from video client 140, data of particular trigger (e.g., a URI or other indicator included in the trigger) that identifies a particular contextual advertisement to retrieve. Once backend server 110 identifies the transactional advertisement and/or instructions, the information may be sent to video client 140. For example, backend server 110 may provide, to video client 140, the transactional advertisement or an indicator (e.g., an IP address or other unique identifier) the appropriate transactional advertisement.

Figure 7:
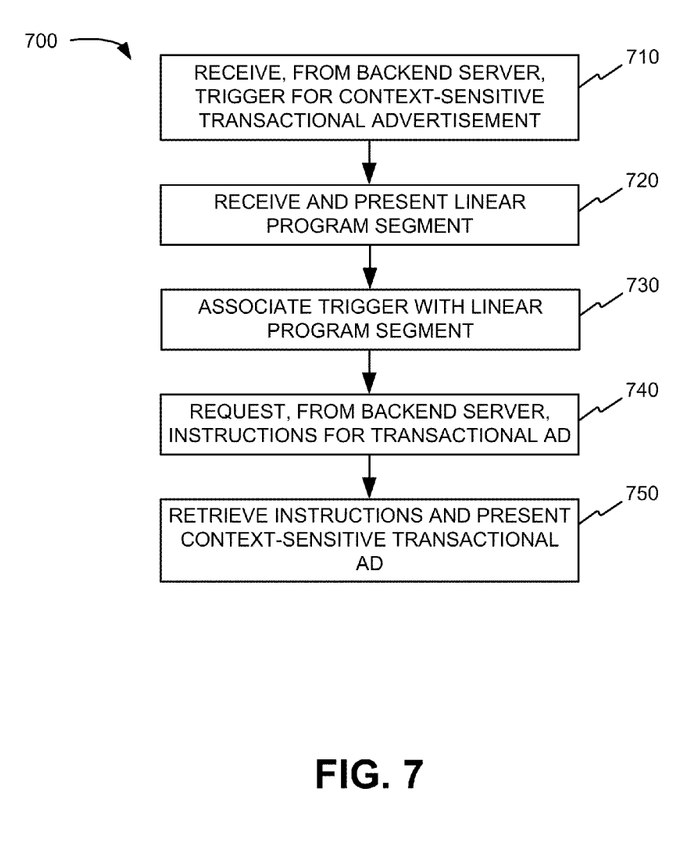
FIG. 7 is a flow chart illustrating an exemplary process for implementing triggers for context-sensitive transactional advertising in a closed distribution network.

FIG. 7 provides a flow chart of an exemplary process 700 for implementing triggers for context-sensitive transactional advertising in a closed distribution network. Some or all of process 700 may be performed by a video client associated with a subscription multimedia service, such as video client 140. In some implementations, some or all of process 700 may be performed by video client 140 in conjunction with backend server 110 and/or content server 130.

Process 700 may include receiving, from a backend server, a trigger for a context-sensitive transactional advertisement (block 710). For example, video client 140 may receive from backend server 110 one or more triggers for one or more transactional advertisements. The triggers may be provided, for example, in the form of in-band data trigger 500, EBIF-based trigger 510, NSP-based trigger 520, slice file 530, and guide data trigger 540 described above in connection with FIG. 5.

A linear program segment may be received and presented (block 720). For example, video client 140 may receive from backend server 110 linear programming that may include advertising and/or other interactive options. The linear programming may be displayed to a user via display device 150. Particular linear program segments of the linear programming may include options for a user to initiate a context-sensitive transactional advertisement. In one implementation, the linear program segment may include, for example, an indication within the linear advertisement that a user may obtain additional information by pressing a particular button on a remote control. In other implementations, the linear program segment may include no explicit indications of an associated transactional advertisement.

The trigger may be associated with the linear program segment (block 730). For example, video client may monitor the currently presented linear program segment for in-band triggers and/or for cross-reference with data indicated by one or more of in-band data trigger 500, EBIF-based trigger 510, NSP-based trigger 520, slice file 530, and/or guide data trigger 540.

Instructions for the transactional advertisement may be requested from the backend server (block 740). For example, video client 140 may notify backend server 110, via access network 180, that a user is viewing (or is about to view) a linear advertisement that is triggered to include interactive access to a transactional advertisement. The notification may include, for example, an identifier of video client 140 (e.g., a unique identification number), an indication of the linear advertisement (e.g., a URI or other source information, time/channel information, in-band trigger data, or another unique identifier) currently being presented, user selection history (e.g., of previously-selected transactional advertisements), the definition capabilities (e.g., SD or HD) of display device 150, and/or other information.

The instructions may be retrieved and the context-sensitive transactional advertisement may be presented (block 750). For example, video client 140 may receive, from backend server 110, instructions for presenting a transactional advertisement on display device 150. The instructions may include, for example, a screen overlay for the linear advertisement (e.g., "press 'A' for more information"), a particular transactional advertisement to display, or information of where to retrieve a transactional advertisement. In another implementation, the transactional advertisement may be retrieved from a local memory (e.g., memory 220) associated with video client 140. In one implementation, the transactional advertisement may provide additional information and transactional options for a product included in the linear advertisement (e.g., the linear advertisement being presented at the time of the user request for the transactional advertisement) and/or other related products.

Figure 8A:
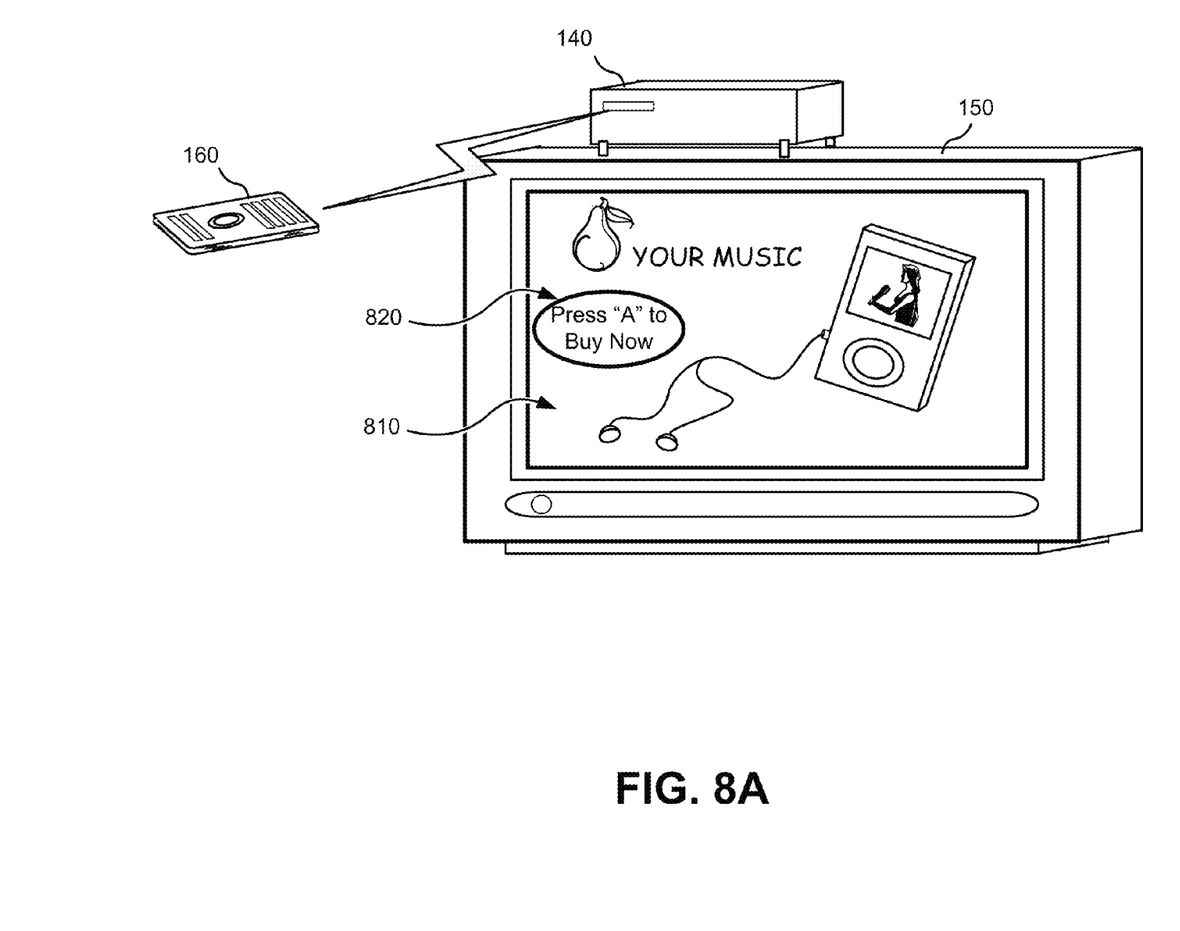
FIGS. 8A and 8B are exemplary diagrams illustrating implementations of a customer interface for transactional advertisements in a closed distribution network.
Figure 8B:
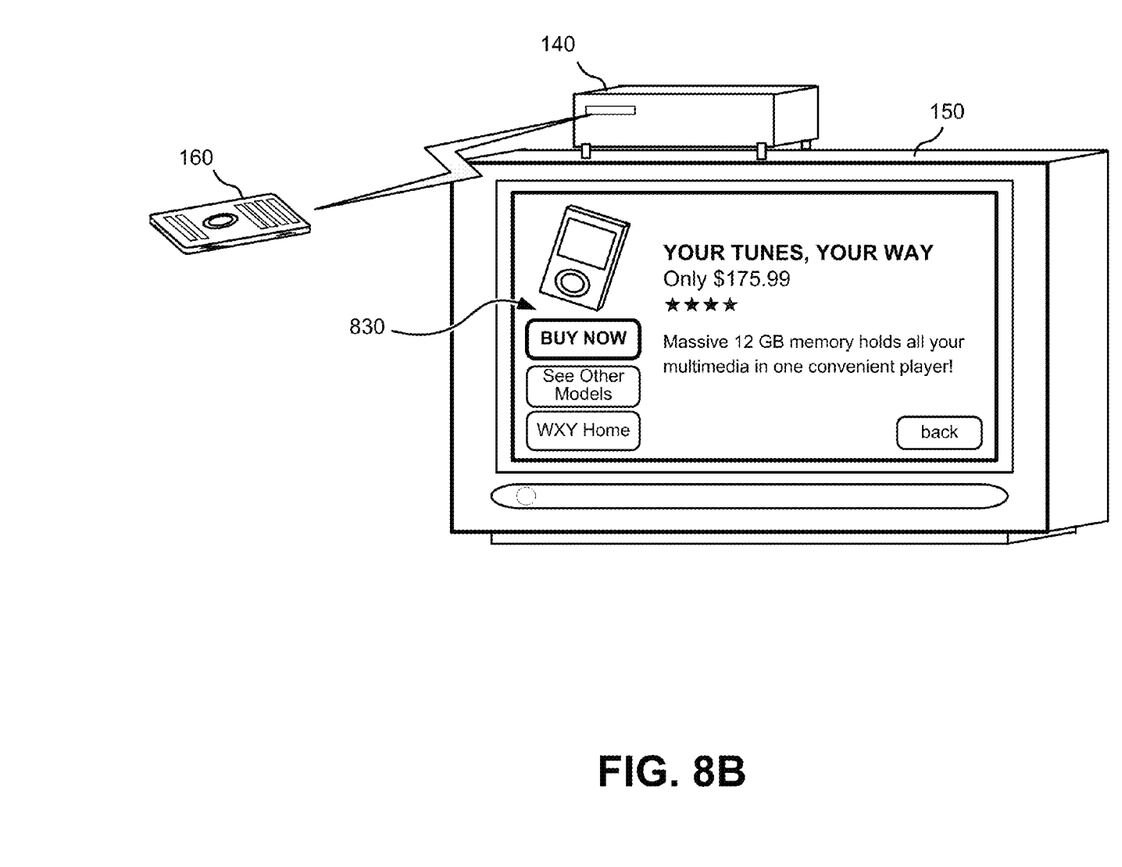

FIGS. 8A and 8B provide exemplary diagrams illustrating implementations of a customer interface for transactional advertisements in a closed distribution network. More specifically, FIG. 8A provides an exemplary diagram of an on-screen display that includes a notification of a transactional advertisement, and FIG. 8B provides an exemplary diagram of a transaction screen for a selected transactional advertisement.

Referring to FIG. 8A, a viewer may view a display on display device 150 that includes a linear program segment. The display on display device 150 may be controlled by video client 140 as directed by user commands from remote control 160. In the example of FIG. 8A, the linear program segment may include a linear advertisement 810. Based on a trigger received from a backend server (e.g., backend server 110, not shown) prior to presentation of the advertisement, video client 140 may identify advertisement 810 as an interactive advertisement. In response to the trigger, video client 140 may provide a request to the backend server for information regarding a transactional advertisement to associate with linear advertisement 810. The backend server may use information from the request and other schedule information to identify a context-specific transactional advertisement to associate with linear advertisement 810. For example, if advertisement 810 promotes a personal music player, the backend server may determine that the transactional advertisement should be for the distributor of that music player. The backend server may send instructions to video client 140 to present an overlay 820 over linear advertisement 810 that indicates to the user that a transactional advertisement is available (e.g., Press 'A' to buy now). Using remote control 160, the user may elect to view to the transactional advertisement.

In one implementation, the user's following of the instructions of overlay 820 may cause video client 140 to present transaction screen 830, as shown in FIG. 8B. Transaction screen 830 may include additional details for the product advertised in linear advertisement 810. Video client 140 may retrieve information for transaction screen 830 from internal memory (e.g., memory 220), from backend server 110, and/or from content server 130 (e.g., via backend server 110). The viewer may navigate (e.g., via remote control 160) transaction screen 830 to initiate a purchase process for the advertised product or view additional information.

The illustrations of FIGS. 8A and 8B are exemplary formats for presenting transactional advertisements in a closed distribution network. Other formats and variations may be used.

Implementations described herein may provide systems and/or methods that trigger context-sensitive transactional advertisements. The systems and/or method may include sending, to a video client, a trigger for initiating a context-specific transactional advertisement associated with a linear program segment and sending the linear program segment for presentation by the video client. The systems and/or methods may also include receiving, based on the trigger, a request from the video client for instructions for the context-specific transactional advertisement; determining, based on the request, contextual information for the linear program segment; and sending, to the video client and based on the contextual information, the instructions for the context-specific transactional advertisement. Thus advertisers and providers can transition a viewer from linear broadcast programming to a context-sensitive interactive transactional advertisement without the current investment of altering broadcast content.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to the flowcharts of FIGS. 6 and 7, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more devices within a closed distribution network, the method comprising:
   sending, by one of the one or more devices and to a video client, a trigger for initiating a transactional advertisement,
      the transactional advertisement being cross-referenced with an indicator associated with a content of a linear program segment;
   sending, by one of the one or more devices and over the closed distribution network, the linear program segment to the video client;
   receiving, by one of the one or more devices and based on the trigger, a request, from the video client, for instructions that enable the video client to provide the transactional advertisement for display in conjunction with the linear program segment;
   using, by one of the one or more devices, information included in the request to determine the instructions and contextual information associated with the transactional advertisement,
      the contextual information relating to the content of the linear program segment, and
      the instructions including information for obtaining the transactional advertisement; and
   sending, by one of the one or more devices and to the video client, the instructions and the contextual information to enable the video client to provide the transactional advertisement for display in conjunction with the linear program segment.

2. The method of claim 1,
   where the request includes information identifying a particular time and a particular channel of the linear program segment; and
   where determining the instructions and the contextual information includes:
      determining that the request is associated with the linear program segment based on the information identifying the particular time and the particular channel, and
      determining the instructions and the contextual information based on the request being associated with the linear program segment.

3. The method of claim 1, where sending the trigger includes:
   sending the trigger in-band over the closed distribution network.

4. The method of claim 1, where sending the trigger includes simultaneously sending triggers associated with multiple linear program segments.

5. The method of claim 1, where the trigger comprises at least one of:
   an Internet protocol (IP) multicast message,
   a file that includes a schedule of linear program segments, over a particular time period, associated with transactional advertisements, or
   a guide data trigger that is incorporated into program guide data for multiple linear program segments.

6. The method of claim 1, where the trigger comprises an in-band data trigger that includes an instruction in an Enhanced TV Binary Interchange Format (EBIF).

7. The method of claim 1, where the trigger includes a uniform resource identifier (URI) for one of the one or more devices.

8. The method of claim 1, where the request from the video client for the instructions for providing the transactional advertisement includes:
   a notification that indicates:
      that the linear program segment is to be provided to a user, and
      that the linear program segment is triggered to include interactive access to the transactional advertisement, and
   at least one of:
      information identifying the video client,
      information identifying the linear program segment, or
      information identifying a user selection history associated with transactional advertisements.

9. The method of claim 1, where the instructions include:
   instructions to present an overlay on a display device,
      where the overlay provides an indicator of the transactional advertisement, and
      where the overlay is presented in conjunction with the linear program segment.

10. The method of claim 1, where the contextual information includes one or more of:
- information identifying a product disclosed within the linear program segment;
- information identifying a demographic profile for the linear program segment;
- information identifying a sponsor of the linear program segment; or
- information identifying a product related to the product disclosed within the linear program segment.

11. A device, comprising:
a memory to store instructions; and
a processor to execute the instructions to:
- send, to a video client, a trigger for initiating a transactional advertisement,
    - the transactional advertisement being cross-referenced with an indicator associated with a content of a linear program segment;
- send, to the video client, the linear program segment for presentation to a viewer;
- receive, based on the trigger, a request from the video client for the transactional advertisement;
- determine that the request is associated with the linear program segment based on information identifying the trigger included in the request;
- use information included in the request to determine contextual information for the transactional advertisement,
    - the contextual information including:
        - information indicating a content of the linear program segment, and
        - information for obtaining the transactional advertisement; and
- send, to the video client, the contextual information to enable the video client to provide the transactional advertisement for display in conjunction with the linear program segment.

12. The device of claim 11, where the processor is further to execute the instructions to:
generate the trigger for initiating the transactional advertisement,
where the trigger indicates a particular time and channel of the linear program segment to be associated with the transactional advertisement.

13. The device of claim 11, where the trigger comprises at least one of:
- a file that includes a schedule of linear program segments over a particular time period,
    - the linear program segments being associated with transactional advertisements, or
- a guide data trigger that is incorporated into program guide data for multiple linear program segments.

14. The device of claim 11, where, when sending the trigger, the processor further executes the instructions to:
send the trigger via an Internet protocol (IP) multicast message.

15. The device of claim 11, where the contextual information further includes instructions, for the transactional advertisement, that include trigger data for multiple linear program segments.

16. A method implemented by a video client, the method comprising:
- receiving, by the video client, a trigger for a transactional advertisement,
    - the transactional advertisement being cross-referenced with a group of indicators associated with a content of a linear program segment;
- receiving, by the video client and via a closed distribution network, the linear program segment for presentation via a display device;
- providing, for display via the display device, the linear program segment;
- associating, by the video client, the trigger with the linear program segment;
- sending, by the video client and to a server, a request for instructions for presenting the transactional advertisement based on associating the trigger with the linear program segment,
    - the request including information that enables the server to provide the instructions for presenting the transactional advertisement;
- receiving, by the video client and over the closed distribution network, the instructions for presenting the transactional advertisement;
- obtaining, by the video client, the transactional advertisement based on the instructions; and
- providing, by the video client, the transactional advertisement for display in conjunction with the linear program segment,
    - the transactional advertisement being displayed in conjunction with the linear program segment based on the instructions for presenting the transactional advertisement.

17. The method of claim 16, where associating the trigger with the linear program segment comprises:
determining, based on the trigger, a particular time and a particular channel of the linear program segment to be associated with the transactional advertisement.

18. The method of claim 16, where associating the trigger with the linear program segment comprises:
identifying the trigger within the linear program segment.

19. The method of claim 16, where the request for instructions for presenting the transactional advertisement includes at least one of:
- information identifying the video client,
- information identifying the linear program segment, or
- information identifying a user selection history associated with transactional advertisements.

* * * * *